(12) United States Patent
Dong et al.

(10) Patent No.: US 11,128,160 B2
(45) Date of Patent: Sep. 21, 2021

(54) SYSTEM AND METHODS FOR CHARGING A BATTERY FOR USE WITH A POWER TOOL

(71) Applicant: Nanjing Chervon Industry Co., Ltd., Nanjing (CN)

(72) Inventors: Zhijun Dong, Nanjing (CN); Yuexiang Zhang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 356 days.

(21) Appl. No.: 16/059,137

(22) Filed: Aug. 9, 2018

(65) Prior Publication Data

US 2019/0140457 A1 May 9, 2019

(30) Foreign Application Priority Data

Nov. 8, 2017 (CN) .......................... 201711088300.X (51) Int. Cl.
*H02J 7/00* (2006.01)
*H01M 10/613* (2014.01)
(Continued)

(52) U.S. Cl.
CPC ..... *H02J 7/007194* (2020.01); *H01M 10/443* (2013.01); *H01M 10/613* (2015.04);
(Continued)

(58) Field of Classification Search
CPC .......... H02J 7/007194; H02J 7/007192; H02J 7/00711; H02J 7/0091; H02J 7/007;
(Continued)

(56) References Cited

U.S. PATENT DOCUMENTS 5,623,195 A * 4/1997 Bullock ................ H02J 7/0091
320/153
6,348,777 B1 * 2/2002 Brown .................. H02J 7/0091
320/137
(Continued)

FOREIGN PATENT DOCUMENTS

| CN | 1115048 A | 1/1996 |
| CN | 105098272 A | * 11/2015 |
| CN | 105098272 B | 7/2017 |

*Primary Examiner* — Richard Isla
*Assistant Examiner* — Manuel Hernandez
(74) *Attorney, Agent, or Firm* — Greenberg Traurig, LLP (57) ABSTRACT

A battery charging method includes detecting a battery temperature and a battery power, determining whether the battery temperature satisfies a preset temperature condition for switching charging processes, performing a first charging process by alternating pulsed charging and discharging when the battery temperature is less than or equal to a first preset temperature value, performing a second charging process including a charge current dynamically adjusted according to the battery temperature and the battery power when the battery temperature is greater than the first preset temperature value and less than a second preset temperature value, and determining whether the battery power is less than a first preset power value when the battery temperature is equal to or greater than the second preset temperature value and less than a third preset temperature value, and performing a third charging process when the battery power is less than the first preset power value.

12 Claims, 9 Drawing Sheets

(51) Int. Cl.
*H01M 10/6235* (2014.01)
*H01M 10/44* (2006.01)

(52) U.S. Cl.
CPC ......... *H01M 10/6235* (2015.04); *H02J 7/007* (2013.01); *H02J 7/00309* (2020.01); *H02J 7/00711* (2020.01); *H02J 7/007192* (2020.01); *H01M 2220/30* (2013.01)

(58) Field of Classification Search
CPC ............. H02J 7/00309; H01M 10/613; H01M 10/6235; H01M 10/443; H01M 10/44; H01M 10/48; H01M 10/486; H01M 2220/30; H01M 2010/4278
USPC .......................................... 320/144, 150, 153
See application file for complete search history.

(56) References Cited

U.S. PATENT DOCUMENTS

| | | | |
|---|---|---|---|
| 2002/0070710 A1* | 6/2002 | Yagi ........................ | B60L 50/60 320/150 |
| 2017/0117587 A1* | 4/2017 | Sugeno ............. | H02J 7/007194 |
| 2018/0113174 A1* | 4/2018 | Furukawa ............. | H02J 7/0091 |

* cited by examiner

Battery Power %

FIG. 6

Battery Power %

SYSTEM AND METHODS FOR CHARGING A BATTERY FOR USE WITH A POWER TOOL

CROSS-REFERENCES TO RELATED APPLICATIONS

This application claims the benefit of Chinese patent application No.CN 201711088300.X, filed on Nov. 8, 2017, the disclosure of which is incorporated herein by reference in its entirety.

TECHNICAL FIELD

The disclosure relates to a battery charging method for a battery pack in a power tool including a handheld power tool, a garden tool, and/or a mower device.

BACKGROUND

With the continuous improvement of battery technology and the continuous increase of battery capacity, battery charge time becomes increasingly longer. To meet people's increasing demand for electric power tools including handheld power tools, garden tools, and/or mower devices, it is needed to increase a charge speed as much as possible on the basis of the existing battery technology.

A charging and discharging process of a lithium-ion battery is essentially a process in which lithium ions transfer between a positive electrode and a negative electrode. Due to the structure of the lithium-ion battery and the principle used by the lithium-ion battery to store electric energy, the charging and discharging performance of the lithium ions is affected by temperature. In the case of low temperature, the reaction rate of electrodes is low, battery performance is low, the amount of electric energy actually charged is small, and the service time of the battery is shortened. Additionally, in a low-temperature charging process of the lithium battery, the lithium ions are easily deposited at the negative electrode and lithium metal crystals are generated. The lithium metal crystals cause a battery separator to rupture and thus cause a short circuit between the positive electrode and the negative electrode, resulting in safety problems. Heat generated by a current in the battery during charging increases the battery temperature. An excessive battery temperature not only reduces a discharge amount and affects usage of the battery, but may also damage the battery and cause an accident in severe cases. Therefore, charging is generally prohibited at high and low temperatures to ensure safety.

SUMMARY

To solve deficiencies in the related art, an object of the present disclosure is to provide a method for dynamically adjusting a charge current in the charging process.

To achieve this object, the present disclosure provides the following solutions.

A battery charging method includes detecting a battery temperature and/or a battery remaining power, performing a first charging process when the battery temperature is less than or equal to a first preset temperature value, performing a second charging process when the battery temperature is greater than the first preset temperature value and less than a second preset temperature value, and performing a third charging process when the battery remaining power is less than the first preset power value and the battery temperature is equal to or greater than the second preset temperature value and less than the third preset temperature value, wherein in the first charging process pulsed charging and pulsed discharging are alternately performed, and a charge current is dynamically adjusted according to the battery temperature and the battery remaining power in the second charging process.

Further, a discharge amount may be adjusted according to the battery temperature in the first charging process.

Further, the discharge amount may be adjusted to zero when the battery temperature rises to the first preset temperature value.

Further, in the third charging process, the charge current may be maintained if it is determined that the battery temperature is in a decreasing trend, and the charge current may be reduced with a predetermined rule if it is determined that the battery temperature is not in a decreasing trend. If it is determined that the battery remaining power is equal to or greater than the second preset power value, the third charging process may be stopped, and the second charging process may be performed when a battery is cooled to a temperature lower than the second preset temperature value.

Further, the battery may be cooled while being charged in the third charging process.

Further, in the third charging process, a value of the battery temperature that is detected currently may be compared with a value of the battery temperature that is detected within a preset time period and it may be determined that the battery temperature is in the decreasing trend if a difference between the value of battery temperature that is detected currently and the value of the battery temperature that is detected within the preset time period is less than a predetermined amount.

Further, in the third charging process, a battery temperature gradient value may be calculated, it may be determined whether the battery temperature gradient value is less than another predetermined amount, and it may be determined that the battery temperature is in the decreasing trend if it is determined that the battery temperature gradient value is less than another predetermined amount.

Further, the battery remaining power may be obtained at least according to an integration of a detected charge current over time and/or an integration of a detected discharge current over time.

Further, the second preset power value may range from 20% to 40%.

Further, the first preset power value may range from 15% to 20%.

Further, provided is a battery charger using any battery charging method described above.

Further, provided is a charging assembly including a battery pack and a charger, and the battery pack includes a plurality of batteries.

The present disclosure has the following advantages. The charge current is dynamically adjusted according to the battery temperature and the battery remaining power, thereby increasing a charge speed, improving a battery life during a quick charge and reducing a charge waiting time.

DETAILED DESCRIPTION

The present disclosure will be described below in detail in conjunction with the accompanying drawings.

Figure 1:
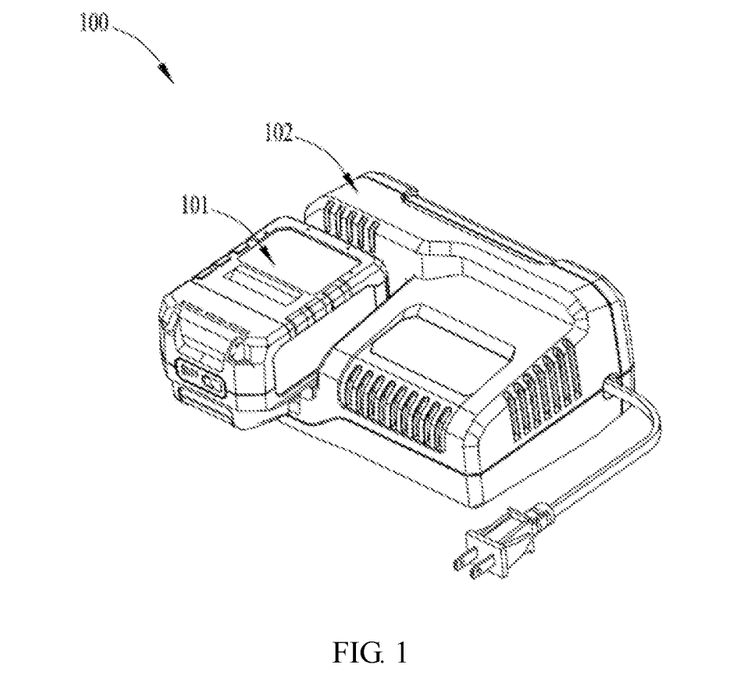
FIG. 1 is a view illustrating an appearance of an exemplary charger and an exemplary battery pack.

Referring to FIG. 1, a battery pack 101 and a charger 102 form a charging assembly 100. The battery pack 101 includes a housing and a battery cell arranged in the housing. More specifically, the charger 102 can obtain the power of the battery pack 101 and a temperature of the battery pack 101 and have the capability to adjust an output current.

A battery charging method includes three charging processes, that is, a first charging process, a second charging process and a third charging process. Battery temperature and battery remaining power are detected, and one of the first charging process, the second charging process and the third charging process is selected according to the battery temperature and the battery remaining power.

In one example, specific steps of the charging method are described below.

In step 1, charging is started.

In step 2, it is determined whether the battery temperature is greater than a first preset temperature value. If it is determined that the battery temperature is greater than the first preset temperature value, the method goes to step 3; if it is determined that the battery temperature is not greater than the first preset temperature value, the first charging process is performed.

In step 3, it is determined whether the battery temperature is equal to or greater than a second preset temperature value. If it is determined that the battery temperature is equal to or greater than the second preset temperature value, the method goes to step 5; if it is determined that the battery temperature is less than the second preset temperature value, the second charging process is performed.

In step 4, it is determined whether the battery temperature is equal to or greater than a third preset temperature value. If it is determined that the battery temperature is equal to or greater than the third preset temperature value, the method goes to step 5 after the battery is cooled to a temperature lower than the third preset temperature value; if it is determined that the battery temperature is less than the third preset temperature value, the method goes to step 5 directly.

In step 5, it is determined whether the battery remaining power is less than a first preset power value. If it is determined that the battery remaining power is less than the first preset power value, the third charging process is performed; if it is determined that the battery remaining power is not less than the first preset power value, the method goes to step 7.

In step 6, it is determined whether the battery remaining power is less than a second preset power value. If it is determined that the battery remaining power is less than the second preset power value, the third charging process is continued; if it is determined that the battery remaining power is not less than the second preset power value, the charging is stopped or suspended and the method goes to step 7.

In step 7, the second charging process is performed after the battery is cooled to a temperature lower than the second preset temperature value.

In step 8, it is determined whether the battery is fully charged. If it is determined that the battery is fully charged, the charging is terminated; if it is determined that the battery is not fully charged, it is determined whether the battery temperature and the battery remaining power satisfy the preset temperature condition and the preset power condition for switching to one of the three charging processes. If the battery temperature and the battery remaining power satisfy the preset temperature condition and the preset power condition of one of the three charging processes, a corresponding charging process is performed.

In the charging processes, the preset temperature values and preset power values of each of the first charging process, the second charging process and the third charging process is determined according to actual situations and is not limited to the description set forth herein. For example, in step 2, "it is determined whether the battery temperature is greater than a first preset temperature value" may also be "it is determined whether the battery temperature is equal to or greater than a first preset temperature value" and, in step 3, "it is determined whether the battery temperature is equal to or greater than a second preset temperature value" may also be "it is determined whether the battery temperature is greater than a second preset temperature value". In short, each "equal" is determined according to actual situations and actual requirements, and each combination of the preset temperature value and preset power value corresponds to only one or at most one charging process.

It is to be noted that the initial charging process of the charging method is selected according to a temperature range where an initial temperature of the battery is located and an initial battery remaining power. Further, in the charging process, the battery temperature and the battery remaining power are detected in real time, and it is determined whether the battery temperature and the battery remaining power satisfy the preset temperature condition and the preset power condition for switching to one of the three charging processes, and a corresponding charging process is performed according to the determination result. For example, the first charging process is performed if the initial temperature of the battery is lower than the first preset temperature value. In performing the first charging process, the second charging process is started once it is detected that the battery temperature exceeds the first preset temperature value. In performing the second charging process, it is determined whether the battery remaining power is less than the first preset power value once it is detected that the battery temperature reaches or exceeds the second preset temperature value. If the battery remaining power is less than the first preset power value, the third charging process is started. If the battery remaining power is not less than the first preset power value, the charging is stopped or suspended, it is waited for the battery to be cooled to a temperature lower than the second preset temperature value, and the second charging process is performed after the battery is cooled to a temperature lower than the second preset temperature value. In performing the third charging process, the charging is stopped once it is detected that the battery remaining power reaches or exceeds the second preset power value, the second charging process is started after the battery is cooled to a temperature lower than the second preset temperature value, and the charging is terminated after the battery is fully charged. The initial battery temperature and the initial battery remaining power are those before the battery is inserted into the charger and is not charged.

In one example, the battery remaining power is obtained at least according to an integration of a detected charge current over time and/or an integration of a detected discharge current over time. Specifically, the battery remaining power is obtained in the following way: the charge current and/or the discharge current is measured, and the battery remaining power, or a difference between the remaining battery power and a rated battery power, or a ratio of the remaining battery power to the rated battery power is estimated at least according to the integration of the charge current over time and/or the integration of the discharge current over time. In other examples of the present disclosure, the battery remaining power may be obtained according to a detected battery voltage. The way the battery remaining power is obtained is not limited herein.

The preset battery temperature values and the preset battery remaining power values are determined according to battery properties such as chemical properties, rated voltage and rated capacity of the battery. Preset battery temperature values and the preset power values of different batteries may be different or the same.

In one example, the first preset temperature value ranges from 0° C. to 3° C., the second preset temperature value ranges from 55° C. to 65° C., and the third preset temperature value ranges from 75° C. to 85° C.

In one example, the first preset power value ranges from 20% to 40%, and the second preset power value ranges from 20% to 40%. The first preset power value may be equal to the second preset power value.

Of course, the ranges of the above-mentioned preset temperature values and the preset power values may also be other temperature ranges and power ranges. The foregoing therefore just illustrates examples.

Figure 2:
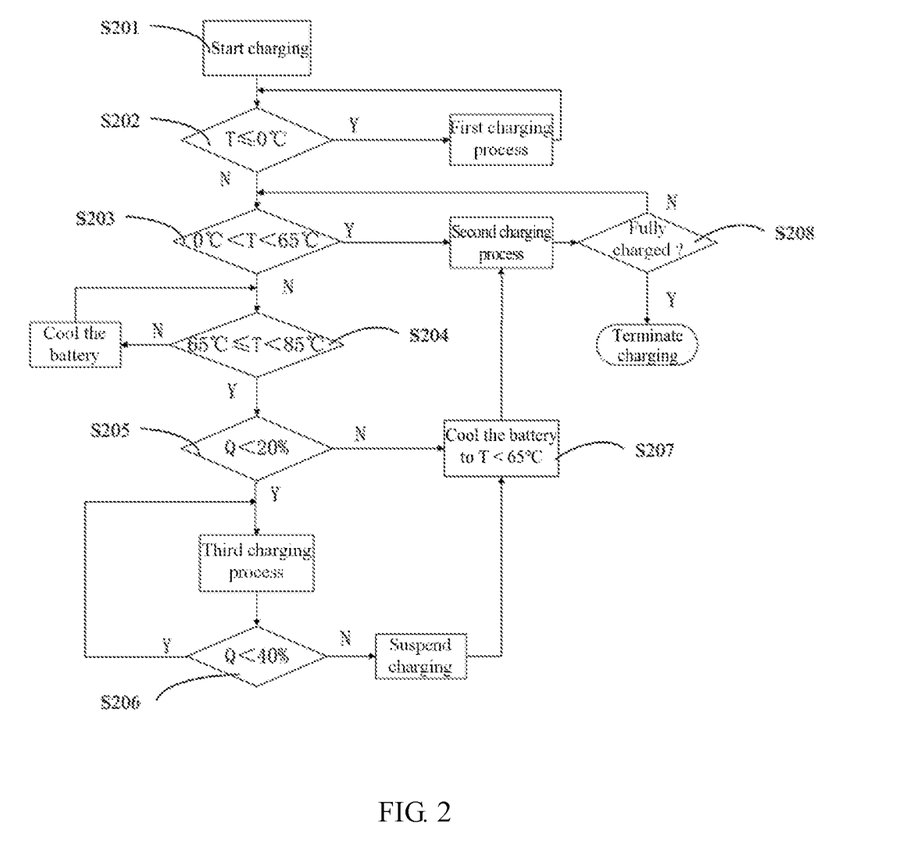
FIG. 2 is a flowchart of an exemplary battery charging method according to an embodiment.

Referring to a flowchart of a battery charging process shown in FIG. 2, the method is illustrated by charging a battery with a rated voltage of 4.2 V and a rated capacity of 3400 mAh as an example. In this example, 0° C. is selected as the first preset temperature value, 65° C. is selected as the second preset temperature value, 85° C. is selected as the third preset temperature value, 20% is selected as the first preset power value, and 40% is selected as the second preset power value. The specific charging process is described below.

In S201, charging is started and the method goes to step S2.

In S202, it is determined whether the battery temperature T is less than or equal to 0° C. If the battery temperature T is less than or equal to 0° C., the method goes to step S203; if the battery temperature T is above 0° C., the first charging process is performed.

In S203, it is determined whether the battery temperature T is less than 65° C. If the battery temperature T is less than 65° C., the second charging process is performed; if the battery temperature T is not less than 65° C., the method goes to step S204.

In S204, it is determined whether the battery temperature T is less than 85° C. If the battery temperature T is less than 85° C., the method goes to step S205. If the battery temperature T is not less than 85° C., the battery is cooled until the battery temperature T is lower than 85° C., and then the method goes to step S205.

In S205, it is determined whether the battery remaining power Q is less than 20%. If the battery remaining power Q is less than 20%, the third charging process is performed. If the battery remaining power Q is not less than 20%, the battery is cooled until the battery temperature T is lower than 65° C., and then the second charging process is performed.

In S206, it is determined whether the battery remaining power Q is less than 40%. If the battery remaining power Q is less than 40%, the third charging process is continued; if the battery remaining power Q is not less than 40%, the charging is stopped or suspended and the method goes to step S207.

In S207, the battery is cooled until the battery temperature T decreases to be lower than 65° C., and then the second charging process is performed.

In S208, it is determined whether the battery is fully charged. if the battery is fully charged, the charging is terminated. If the battery is not fully charged, it is determined which one of the preset temperature conditions is satisfied by the battery temperature, and a corresponding charging process is performed.

Figure 3A:
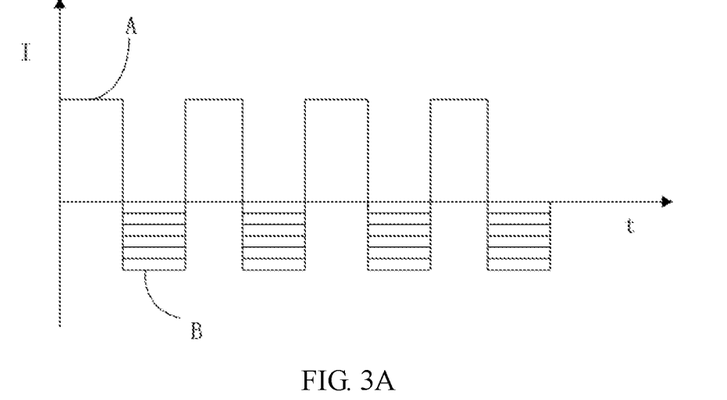
FIG. 3A is a diagram illustrating waveforms of a charge current and a discharge current as a function of time in a charging process according to the disclosure that follows.

Specifically, pulsed charging and pulsed discharging are alternately performed in the first charging process. FIG. 3A is a diagram illustrating waveforms of a charge current A and a discharge current B as a function of time in the first charging process according to an example. In this example, the width of the charging pulse and the width of the discharging pulse are the same, but the peak of the charging pulse and the peak of the discharging pulse are different.

Figure 3B:
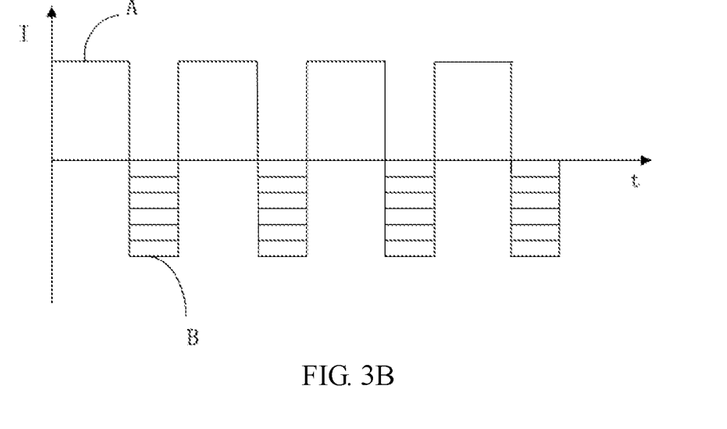
FIG. 3B is another diagram illustrating waveforms of a charge current and a discharge current as a function of time in a charging process according to the disclosure that follows.

FIG. 3B is a diagram illustrating waveforms of a charge current A and a discharge current B as a function of time in the first charging process according to another example. In this example, the peak of the charging pulse and the peak of the discharging pulse are the same, but the width of the charging pulse and the width of the discharging pulse are different. Other alternatives in which pulsed charging and pulsed discharging, for example, triangular waveform pulsed charging and pulsed discharging, are alternately performed are also applicable to the present disclosure. In the first charging process, a discharge amount is determined by the battery temperature, the discharge amount gradually decreases as the battery temperature rises, and the discharge amount is 0 when the battery temperature rises to the first preset temperature value.

Figure 4:
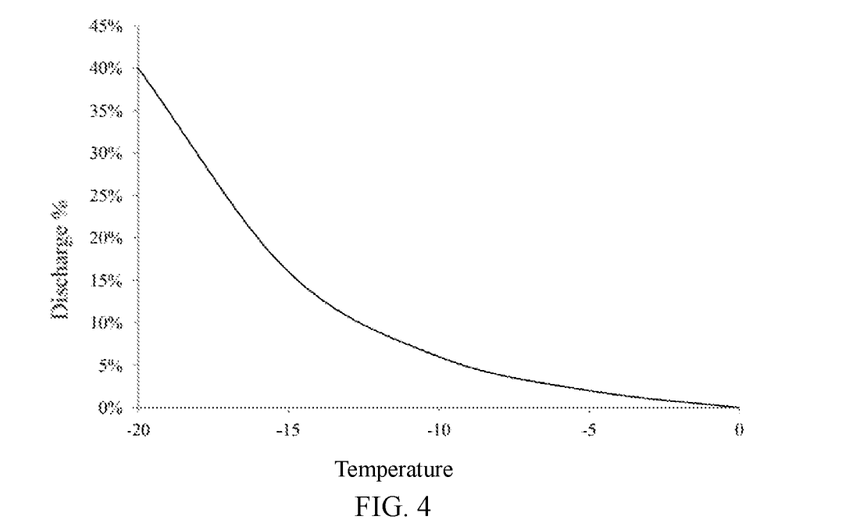
FIG. 4 is a diagram illustrating a relationship of a discharge amount proportion and battery temperature in a charging process according to the disclosure that follows.

In the first charging process, the discharge amount is adjusted according to the battery temperature. FIG. 4 is a diagram illustrating a relationship of a discharge amount proportion and the battery temperature in the first charging process according to an example. In this example, the battery is a lithium battery with a rated capacity of 3400 mAh and a rated voltage of 4.2 V. The data in FIG. 4 is obtained from repeated experiments. Here, the discharge amount proportion is the percentage of the discharge amount in the total of the charge amount and the discharge amount. Here, the charge current and the discharge current of the battery are detected, and the charge amount is obtained according to the integration of the charge current over time, and the discharge amount is obtained according to the integration of the discharge current of the battery over time. The relationship between the discharge amount proportion and the battery temperature is related to battery properties. The relationship between the discharge amount proportion and the battery temperature varies with batteries with different properties. Battery properties include chemical properties, rated voltage and rated capacity of the battery.

In one example, when the battery temperature rises to the first preset temperature value, the discharge amount is adjusted to zero. For example, the first preset temperature value of FIG. 4 is 0° C. Once the battery temperature reaches 0° C. or exceeds 0° C., the battery is no longer discharged and is only charged to meet the charging demand.

Within a temperature range less than the first preset temperature value, through the step of alternately performing pulsed charging and pulsed discharging, the temperature of the battery pack can be increased during the charging. To more effectively eliminate lithium metal precipitated on the surface of the negative electrode due to low-temperature charging, a shorter discharge time and a larger discharge current are set in the first charging process, that is, the lithium metal on the surface of the negative electrode is eliminated by a negative pulse that discharges via a high current in a short time.

In the second charging process, the charge current is determined by the battery temperature and the remaining battery power. The maximum allowable charge current of the battery is related to the battery temperature. Within a certain allowable temperature range, the higher the battery temperature, the greater the maximum allowable current of the battery.

Figure 5:
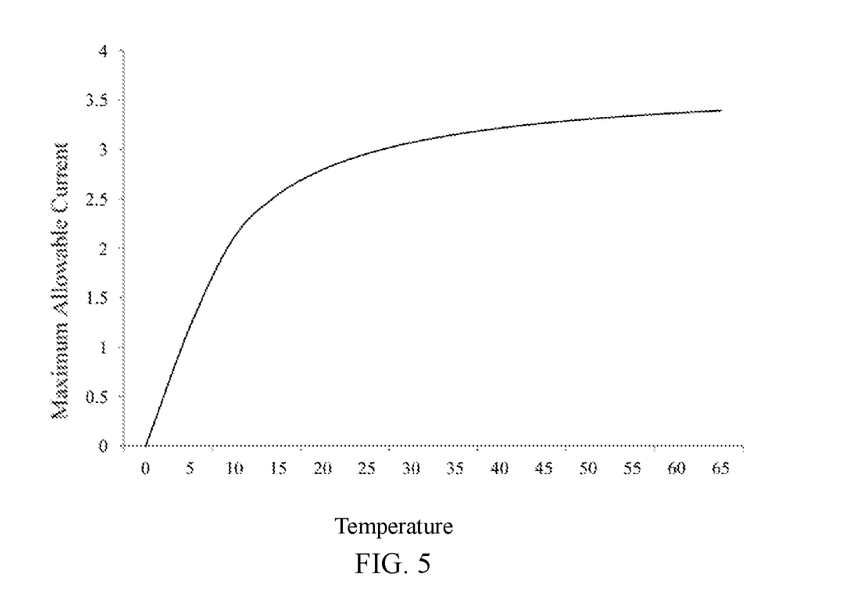
FIG. 5 is a diagram illustrating a relationship of the maximum allowable charge current of a battery and battery temperature in a charging process according to the description that follows.

FIG. 5 shows a relationship between the maximum allowable charge current and the battery temperature of a lithium battery with a rated capacity of 3400 mAh and a rated voltage of 4.2 V. This relationship is denoted as follows:

$$I_0 = 3.7 \times e^{-5.6/T} \quad (1)$$

$I_0$ denotes the maximum allowable charge current of the battery. T denotes the battery temperature. The relationship between the maximum allowable charge current and the battery temperature varies with batteries with different properties (such as chemical properties, rated voltage and rated capacity of the battery). Here, the formula (1) and the FIG. 5 are only examples. The relationships between the maximum allowable charge current and the battery temperature of other batteries can all be obtained through repeated experiments.

It is known to those skilled in the art that the charge current of the battery is also related to the battery remaining power. The higher the battery remaining power, the smaller the charge current. The charge current I and the battery remaining power Q can be calculated using the following formula:

$$I = I_0 \times (1-Q) \quad (2)$$

Figure 6:
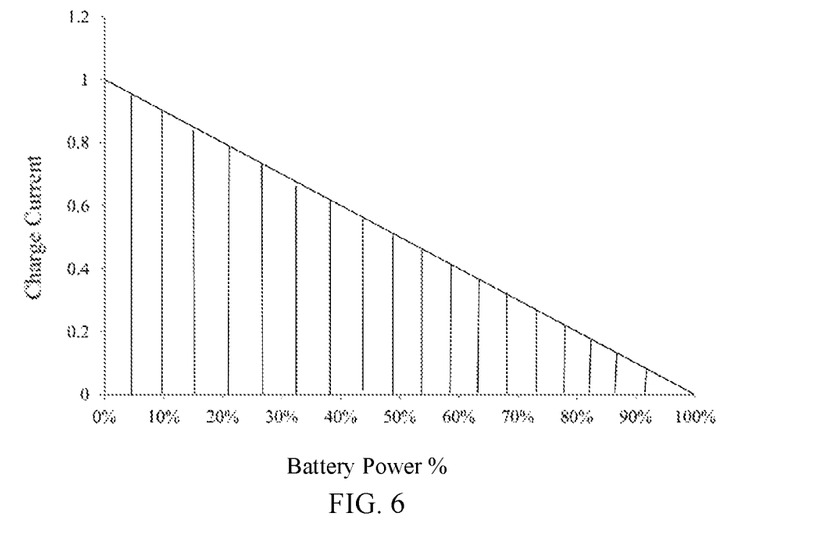
FIG. 6 is a diagram illustrating a relationship of a charge current and battery remaining power in a charging process according to the description that follows.

Q denotes the ratio between the remaining battery power and the rated battery power. The value of Q is less than 1. Referring to FIG. 6, the higher the battery remaining power Q, the smaller the charge current I. FIG. 6 shows the ratio of the charge current I to the maximum allowable charge current I0. The charge current less than the charge current I indicated by the shaded area in FIG. 6 is the range of the allowable charge current. The charge current indicated by the shaded area can all charge the battery without damaging the battery.

By combining the formula (1) and the formula (2), the relationship between the charge current I, the battery temperature T and the battery remaining power Q is obtained as follows:

$$I = 3.7 \times e^{-5.6/T} \times (1-Q) \quad (3)$$

The detected battery remaining power Q and battery temperature T are substituted into the formula (3) to obtain the charge current of the lithium battery with a rated capacity of 3400 mAh and a rated voltage of 4.2 V. For example, if the battery remaining power Q is 0.2 and the battery temperature T is 50° C., the calculated charge current is about 2.646 A. It is to be noted that the charge current I calculated by the formula (3) is the maximum allowable charge current, and any charge current less than this calculated value can be used to charge the battery. To obtain a faster charge speed, the charge current I calculated according to the formula (3) is used as the charge current in the second charging process of the present disclosure.

Figure 7:
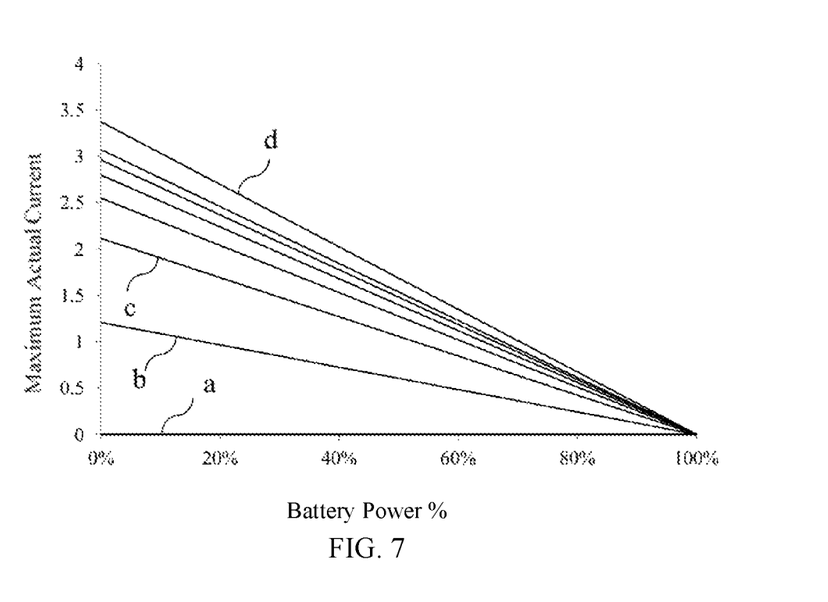
FIG. 7 is a diagram illustrating a relationship of the maximum actual charge current and battery remaining power under different battery temperatures in a charging process according to the description that follows.

In one example, the battery is a lithium battery with a rated capacity of 3400 mAh and a rated voltage of 4.2 V. It is obtained from repeated experiments that the relationship between the charge current I, the battery temperature T and the battery remaining power Q within the range of 0° C. to 65° C. is as shown in FIG. 7. In the figure, a, b, c and d indicate the relationship between the charge current I and the battery remaining power Q at 0° C., 5° C., 10° C. and 65° C., respectively. Of course, the figure is merely an exemplary illustration, and the battery temperature may be any temperature within the range of 0° C. to 65° C. It can be seen from the figure that the higher the battery temperature T, the steeper the incline or slope of the line or curve indicating the relationship between the charge current I and the battery remaining power Q.

In the second charging process, the conventional constant current-constant voltage charging method is used, the charging capability of the charger is not fully utilized when the battery voltage is low, and maintaining a large charge current in the early and middle stages of the charging process affects the battery life. In the second charging process of the present disclosure, the charge current is dynamically adjusted according to the battery remaining power and the battery temperature, fully utilizing the charging capability of the charger and not affecting the battery life.

Figure 8A:
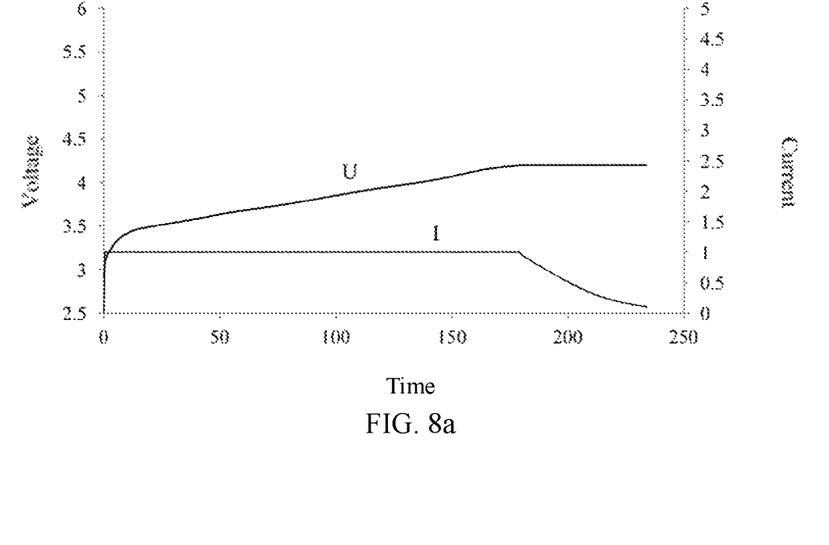
FIG. 8A is a diagram illustrating a relationship of a voltage of a battery and time and a relationship of a current of the battery and time when a constant current-constant voltage charging method is used in a charging process according to the description that follows.
Figure 8B:
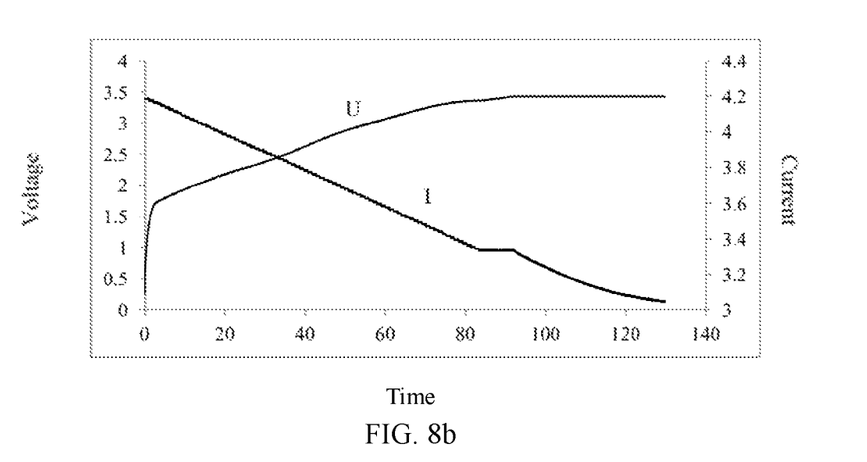
FIG. 8B is a diagram illustrating a relationship of a voltage of a battery and time and a relationship of a current of the battery and time when a charging method in which a charge current is dynamically adjusted according to battery temperature and battery remaining power is used in a charging process according to the description that follows.

Referring to FIGS. 8A and 8B, the conventional constant current-constant voltage battery charging method is used in the second charging process as shown in FIG. 8A, and the battery charging method in which the charge current is dynamically adjusted according to the battery temperature and the battery remaining power is used in the second charging process as shown in FIG. 8B. It can be seen from FIGS. 8A and 8B that the time for charging the battery to 4.2

V by using the battery charging method in which the charge current is dynamically adjusted according to the battery temperature and the battery remaining power is less than that by using the conventional constant current-constant voltage battery charging method. That is, under the same conditions, the charge time in the battery charging method in which the charge current is dynamically adjusted according to the battery temperature and the battery remaining power is shorter.

Figure 9:
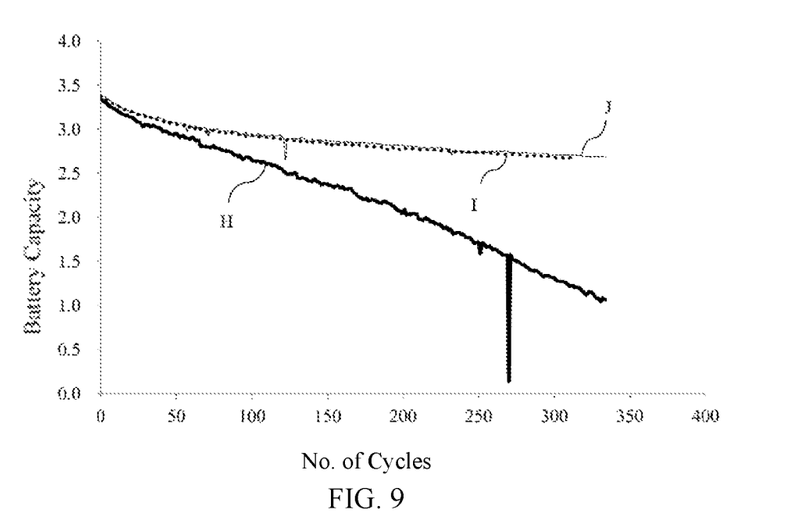
FIG. 9 is a diagram illustrating relationships of a battery capacity and the number of charging and discharging cycles in different charging methods according to the description that follows.

Referring to FIG. 9, the lithium battery with a rated capacity of 3400 mAh and a rated capacity of 4.2 V is charged using three different charging methods so as to compare the impacts of different charging methods on the battery life. The first charging method is to charge the battery using a constant current-constant voltage method, the constant current is 3.4 A and the time it takes to fully charge the battery is 95 minutes. The second charging method is to charge the battery using a constant current-constant voltage method, the constant current is 1A and the time it takes to fully charge the battery is 240 minutes. The third charging method is to dynamically adjust the charge current according to the battery temperature and the battery remaining power and the time it takes to fully charge the battery is 130 minutes. As can be seen from FIG. 9, the battery life of the battery that is charged by using the method in which the charge current is dynamically adjusted according to the battery temperature and the battery remaining power is substantially the same as the battery life of the battery that is charged by using the constant current-constant voltage method where the constant current is 1A. Therefore, the battery charging method in which the charge current is dynamically adjusted according to the battery temperature and the battery remaining power has little impact on the battery life.

In the third charging process, it is needed to monitor the battery temperature T and the battery remaining power Q when the battery is being charged. Specifically, it is needed to constantly monitor the battery temperature T and determine whether the battery temperature T is in a decreasing trend. If the battery temperature T is in a decreasing trend, the battery is charged using the currently used charge current. If the battery temperature T is not in a decreasing trend, the battery is charged after the charge current is reduced according to a predetermined rule. The predetermined rule is set according to the actual battery properties and charging requirements. For example, for a rated voltage of 4.2 V and a rated capacity of 3400 mAh, the predetermined rule may be reducing the charge current by 2A each time for the sake of safety and may be reducing the charge current by 1A each time for the sake of time. At the beginning of the third charging process, the battery is charged using the charge current I (that is, I=I (Q,T)) calculated from the battery temperature T and the battery remaining power Q described in the second charging process.

There are several ways to determine whether the battery temperature is in the decreasing trend. For example, a comparison method is used to determine whether the battery temperature T is in the decreasing trend: a value the battery temperature that is detected currently is compared with a value of the battery temperature that is detected within a preset time period; if a difference ΔT between the value of the battery temperature that is detected currently and the value of the battery temperature that is detected within the preset time period is less than a predetermined amount, the battery temperature is in the decreasing trend. The preset time period may be a sampling interval, then the value of battery temperature detected within the preset time period is a value of the battery temperature detected in the previous sampling. Here, the predetermined amount may be selected according to the actual situation to obtain a fast and safe charging process. For example, the predetermined amount may be 0° C.

Figure 10:
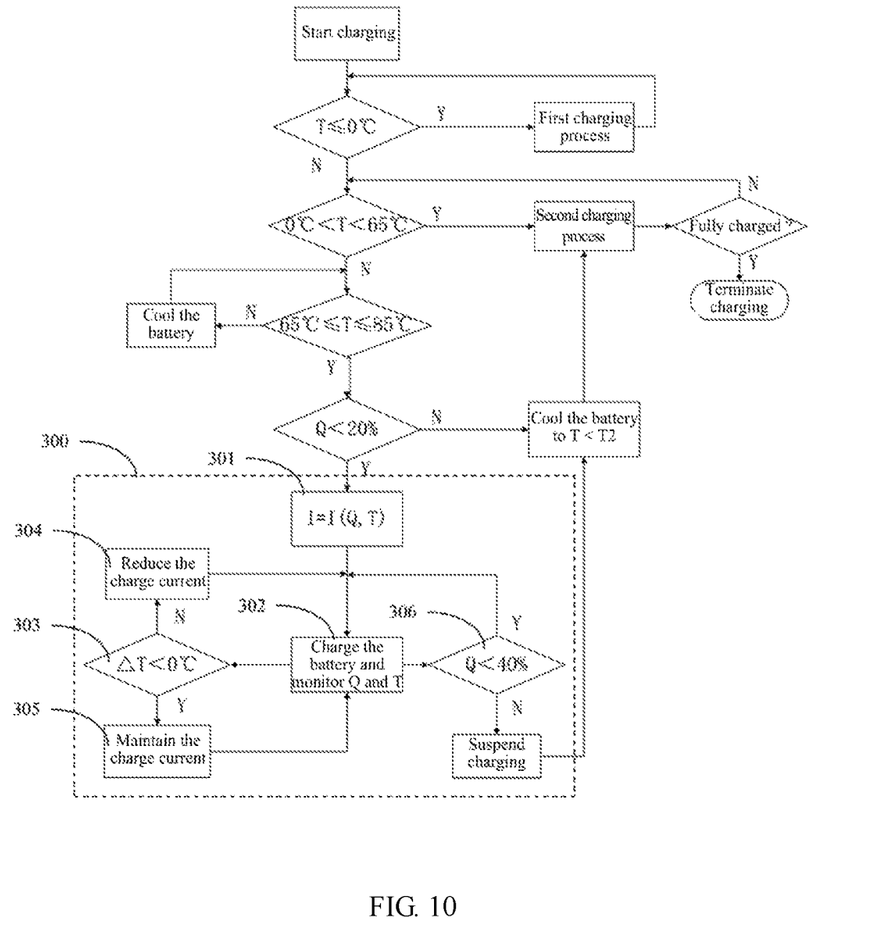
FIG. 10 is a flowchart of a further charging process of a battery charging method according to the description that follows.

In one embodiment, the second preset power value is 40%, the second preset temperature value is 65%, and the predetermined amount is 0° C. Referring to FIG. 10, the process of determining whether the battery temperature is in the decreasing trend by using the comparison method in the third charging process 300 is described below.

In S301, an initial charge current I=I(Q,T) is set according to the battery temperature T and the battery remaining power Q.

In S302, the battery is charged, and the battery temperature T and the battery remaining power Q are monitored.

In S303, the value of the battery temperature detected currently is compared with the value of the battery temperature detected within the preset time period, and it is determined whether the difference ΔT between the value of the battery temperature detected currently and the value of the battery temperature detected within the preset time period is less than 0° C. If the difference is less than 0° C., the method goes to step S305, and if the difference is not less than 0° C., the method goes to step S304.

In S304, the charge current is reduced according to the predetermined rule, and then the method goes to step S302.

In S305, the battery is charged using the current charge current, and then the method goes to step S302.

In S306, it is determined whether the battery remaining power Q is less than 40%. If the battery remaining power Q is less than 40%, the method goes to step S302, and if the battery remaining power Q is not less than 40%, the charging is stopped or suspended, the battery is cooled to a temperature lower than 65° C., and then the second charging process is started.

The method of calculating a battery temperature gradient value can also be used to determine whether the battery temperature is in the descending trend. If the battery temperature gradient value is less than another predetermined amount, the battery temperature is in the descending trend. The process of determining whether the battery temperature is in the descending trend in the third charging process by calculating the gradient value is similar to the process of determining whether the battery temperature is in the descending trend in the third charging process by using the comparison method and thus is not described herein.

Figure 11:
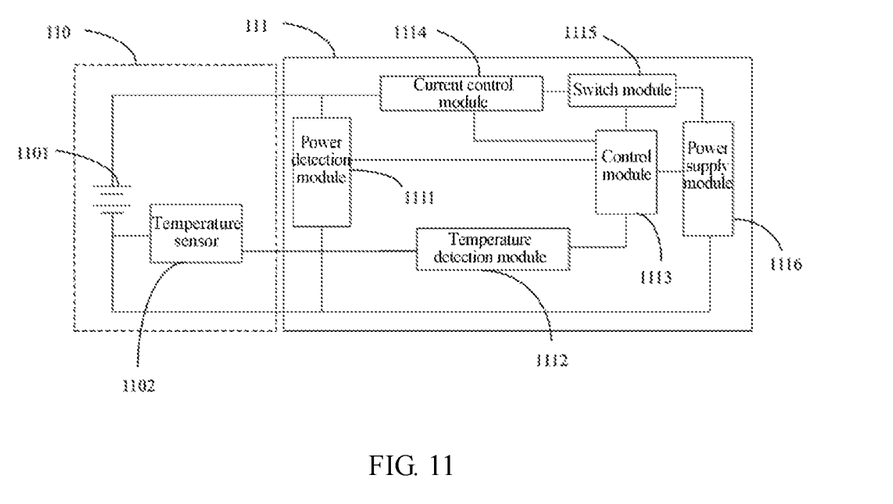
FIG. 11 is a schematic diagram of an exemplary charging assembly.

Referring to FIG. 11, a charging assembly includes a battery pack 110 and a charger 111. Multiple battery cells and a temperature sensor are disposed in the battery pack 110. The charging assembly further includes a power detection module 1111, a temperature detection module 1112, a control module 1113 and a current control module 1114.

The temperature sensor 1102 in the battery pack 110 may be a thermistor such as a negative temperature coefficient (NTC) thermistor or a positive temperature coefficient (PTC) thermistor. The temperature sensor 1102 is disposed on a surface of a battery cell and used for detecting a temperature of the surface of the battery cell. The power detection module 1111, the temperature detection module 1112, the control module 1113 and the current control module 1114 are disposed in the charger 111. In addition, the charger 111 may further include a switch module 1115 for allowing and blocking the charge current, and a power supply module 1116 for adjusting or varying an external power source to be an electric energy that can be suitable for the other electronic components or circuits in the battery pack 110 and/or the charger 111. Of course, the power detection module 1111 and the temperature detection module 1112 may also be disposed in the battery pack, which is not limited herein.

When the battery pack 110 is inserted into the charger 111, the temperature sensor 1102 in the battery pack 110 is coupled to the temperature detection module 1112 of the charger 111, and the power detection module 1111 is electrically connected to positive and negative terminals at two ends of the battery pack 110 to detect power of the battery pack 110. The power detection module 1111, the temperature detection module 1112, the current control module 1114, the switch module 1115 and the power supply module 1116 are all coupled to the control module 1113. The current control module 1114 is electrically connected to a charging circuit and receives a control signal from the control module 1113 to adjust a charge current that is provided to the battery pack 110. The switch module 1115 is electrically connected to the charging circuit and coupled to the current control module 1114, receives a control signal from the control module 1113 and switches a state of a switch to control connection and disconnection of the charging circuit. The specific working process is as follows: the power detection module 1111 and the temperature detection module 1112 send received power information and temperature information of the temperature sensor 1102 to the control module 1113, and the control module 1113 processes the power information and the temperature information, and then sends a control signal to the current control module 1114 to adjust the charge current or sends a control signal to the switch module 1115 and controls connection and disconnection of the charging circuit to allow or prohibit the charge current from flowing to the battery pack 110.

A circuit board is disposed in the charger 111. The power detection module 1111, the temperature detection module 1112, the control module 1113, the current control module 1114, the switch module 1115 and the power supply module 1116 are all integrated on the circuit board in the charger 111.

The battery pack 110 includes a battery pack housing that forms at least a first adapting portion for coupling the battery pack 110 to the charger 111. The charger 111 includes a charger housing that forms at least a second adapting portion joined to the first adapting portion. The battery pack housing is provided with a vent, and the charger housing is provided with at least one air inlet and at least one air outlet to form an air duct. When the battery pack 110 is joined to the charger 111, the vent of the battery pack 110 is joined to the air outlet of the charger.

In the third charging process, in addition to terminating the charging and waiting for the battery to be naturally cooled, the battery can also be actively cooled while being charged so as to obtain a better cooling effect and reduce the charging waiting time. To actively cool the battery pack 110, various methods can be used, for example, disposing a heat sink or a phase change material inside the battery pack housing or air cooling. The external air enters the interior of the charger 111 through the air inlet on the housing of the charger 111, and then enters the battery pack 110 through the air outlet on the housing of the charger 111 and the vent on the housing of the battery pack 110 to dissipate heat from the battery pack 110. To further enhance the heat dissipation effect, a fan may be disposed inside the housing of the charger 111. The fan is connected to the circuit board inside the charger 111, and the fan is always operating during the third charging process to dissipate heat from the battery pack 110.

As a possible implementation mode, the cooling may be performed by any one or a combination of various heat dissipating elements having a heat dissipating effect, such as a heat sink, a phase change material or a fan.

In the first charging process, an auxiliary heating may be provided while the battery pack 110 is being charged so that the temperature of the battery pack 110 rises and thus a better heating effect is achieved and the charge speed is improved. Generally, the battery pack 110 is heated by external heating. For example, a heating portion is disposed in the air duct of the charger 111, the heating portion is connected to the circuit board of the charger 111, and the heat generated by the heating portion heats the battery pack 110 through the air in the air duct. The heating portion is disposed in the air duct and close to the air outlet of the charger 111. The external air enters the charger 110 through the air inlet of the charger 110, quickly flows through the heating portion and the air outlet of the charger to lead the heat to the battery pack 110 to heat the battery pack 110 and accelerate the heating effect of the battery pack.

As a possible implementation, the heating portion may be any one or a combination of electrical heating elements having a heating effect, such as a heating wire, an electric heating tube or a thermistor.

The heat of the battery pack 110 may come from heat generated by components on the circuit board and dissipated through the heat sink in addition to the heat generated by the heating portion. Specifically, a fan may be disposed in the air duct, and the fan is located between the heating portion and the circuit board. When the charger 111 heats the battery pack 110, the fan rotates, extracts the heat of the heat sink on the circuit and blows the heat of heating portion to the battery pack 110 to heat the battery pack 110. The heating effect of the battery pack 110 is further improved by the action of air extraction and air blowing.

The above illustrates and describes basic principles, main features and advantages of the present disclosure. It is to be understood by those skilled in the art that the above embodiments do not limit the present disclosure in any form, and all solutions obtained by means of equivalent substitution or equivalent transformation fall within the protection scope of any claim presented hereinafter.

What is claimed is:

1. A battery charging method for a battery pack in a power tool, comprising:
   detecting a battery temperature and a battery remaining power;
   performing a first charging process when the battery temperature is less than or equal to a first preset temperature value;
   performing a second charging process when the battery temperature is greater than the first preset temperature value and less than a second preset temperature value; and
   performing a third charging process when the battery remaining capacity power is less than a first preset remaining power value and the battery temperature is equal to or greater than the second preset temperature value and less than a third preset temperature value,
   wherein in the first charging process, pulsed charging and pulsed discharging are alternately performed, and
   wherein in the second charging process the battery pack of the power tool is charged with a charge current dynamically adjusted according to the battery temperature and the battery remaining power.

2. The battery charging method of claim 1, wherein a discharge amount is adjusted according to the battery temperature in the first charging process.

3. The battery charging method of claim 2, wherein the discharge amount is adjusted to zero when the battery temperature rises to the first preset temperature value.

4. The battery charging method of claim 1, wherein in the third charging process, the charge current is maintained if it is determined that the battery temperature is in a decreasing trend and the charge current is reduced with a predetermined rule if it is determined that the battery temperature is not in a decreasing trend and, if it is determined that the battery remaining power is equal to or greater than a second preset remaining power value, the third charging process is stopped and the second charging process is performed when a battery is cooled to a temperature lower than the second preset temperature value.

5. The battery charging method of claim 4, wherein the battery is cooled while being charged in the third charging process.

6. The battery charging method of claim 4, wherein in the third charging process, a value of the battery temperature that is detected currently is compared with a value of the battery temperature that is detected within a preset time period and it is determined that the battery temperature is in the decreasing trend if a difference between the value of battery temperature that is detected currently and the value of the battery temperature that is detected within the preset time period is less than a predetermined amount.

7. The battery charging method of claim 4, wherein, in the third charging process, a battery temperature gradient value is calculated, it is determined whether the battery temperature gradient value is less than another predetermined amount, and it is determined that the battery temperature is in the decreasing trend if it is determined that the battery temperature gradient value is less than another predetermined amount.

8. The battery charging method of claim 4, wherein the second preset remaining power value ranges from 20% to 40% of a maximum battery power of the battery pack.

9. The battery charging method of claim 1, wherein the battery remaining power is obtained at least according to an integration of a detected charge current over time and/or an integration of a detected discharge current over time.

10. The battery charging method of claim 1, wherein the first preset remaining power value ranges from 15% to 20% of a maximum battery power of the battery pack.

11. A battery charger using the battery charging method of claim 1.

12. A charging assembly comprising a battery pack and a charger, wherein the battery pack comprises a plurality of batteries and the charger uses the battery charging method of claim 1.

* * * * *